US00RE36313E

United States Patent [19]

Kahr

[11] E Patent Number: Re. 36,313

[45] Reissued Date of Patent: Sep. 28, 1999

[54] DISC BRAKE SHOE ASSEMBLY

[75] Inventor: Joseph C. Kahr, South Pines, N.C.

[73] Assignee: Westinghouse Air Brake Company, Wilmerding, Pa.

[21] Appl. No.: 08/886,734

[22] Filed: Jul. 1, 1997

Related U.S. Patent Documents

Reissue of:

[64] Patent No.: 5,429,216
Issued: Jul. 4, 1995
Appl. No.: 08/242,690
Filed: May 13, 1994

[63] Continuation of application No. 08/095,585, Jul. 23, 1993, abandoned.

[51] Int. Cl.[6] ..... F16D 69/00

[52] U.S. Cl. ..... 188/250 R; 188/250 E; 188/73.31

[58] Field of Search ..... 188/250 R, 250 E, 188/73.31, 250 B, 250 C, 250 D, 250 F, 250 G, 264 G, 261, 253, 234, 235, 242–244, 247

[56] References Cited

U.S. PATENT DOCUMENTS

| | | | |
|---|---|---|---|
| 3,052,943 | 9/1962 | Jones | 188/250 R |
| 3,064,769 | 11/1962 | Billmeyer | 188/250 R |
| 3,503,475 | 3/1970 | Mione | 188/250 R |
| 4,240,530 | 12/1980 | Tillenburg | 188/250 E |
| 4,660,685 | 4/1987 | Thacker et al. | 188/250 E X |
| 4,775,036 | 10/1988 | Harrison | 188/250 B |

FOREIGN PATENT DOCUMENTS

| | | | |
|---|---|---|---|
| 2713377 | 9/1977 | Germany | 188/250 B |
| 2625348 | 12/1977 | Germany | 188/250 B |
| 3109992 | 9/1982 | Germany | 188/250 E |
| 0080532 | 7/1981 | Japan | 188/250 B |
| 0211032 | 12/1983 | Japan | 188/250 B |
| 0093527 | 4/1987 | Japan | 188/250 B |
| 1092251 | 11/1967 | United Kingdom | 188/250 B |

*Primary Examiner*—Peter M. Poon
*Attorney, Agent, or Firm*—James Ray & Associates

[57] ABSTRACT

A disc brake shoe in which a relatively thin gage, low-cost metal backing plate has bonded to one face a friction brake lining and is formed on the opposite face with a plurality of straps that are adapted to engage corresponding recesses formed in a complementary thick gage metal backing plate to interlock the respective backing plates into a unitary brake shoe assembly which can be easily disassembled to permit change-out of a worn brake shoe by simply substituting a newly lined, low cost backing plate for the existing backing plate having worn lining without the need to re-claim the backing plate for re-use.

20 Claims, 3 Drawing Sheets

DISC BRAKE SHOE ASSEMBLY

Matter enclosed in heavy brackets [ ] appears in the original patent but forms no part of this reissue specification; matter printed in italics indicates the additions made by reissue.

This is a continuation of copending application Ser. No. 08/095,585 filed on Jul. 23, 1993, now abandoned.

BACKGROUND OF THE INVENTION

The present invention is related to disc type brake shoes for railway vehicles and particularly to a segmented disc brake shoe assembly.

Presently, disc brake shoe linings are molded and machined into a block of composition friction material having a configuration, as shown in FIG. 1, corresponding generally to a metal backing plate such as shown in FIG. 2. The molded block of friction material and the backing plate are provided with a multitude of conforming holes through which rivets are inserted to secure the brake shoe lining to the backing plate. In order to support the brake shoe lining under heavy brake loads without any appreciable bending, which could cause the lining to crack, the backing plate is formed from relatively thick gage, high strength steel and thus represents a costly item of a brake shoe. Consequently, it is desirable to reclaim these backing plates for re-use, which requires removal of the multitude of securing rivets in order to dis-assemble the worn brake shoe lining from its backing plate. This, in itself, is an expensive operation.

Moreover, the multitude of rivet holes in the brake lining reduce the strength and wearability factor of the composition friction material of the brake shoe lining, while the cost of machining the friction material as required by the specific backing plate design, and the expense of securing the replacement brake shoe lining to the backing plate by means of rivets still exists.

State-of-the-art technology makes it possible to chemically bond the composition friction brake lining to the metal backing plate to eliminate the above-discussed disadvantages of rivets, but reclaiming the backing plate from worn brake shoes for re-use still entails a difficult, time-consuming operation to remove the friction material and to clean the backing plate sufficiently, as required for bonding the new brake shoe material thereto during the re-lining process. In addition, the thick gage backing plate with worn linings must be transported from the customer to the brake lining manufacturing facility for relining and subsequent delivery back to the customer. These expenses are even further exacerbated where different thickness backing plates must be stocked to accommodate various wear states of the brake disc, where brake units without automatic slack adjusting means are employed.

SUMMARY OF THE INVENTION

It is therefore an object of the present invention to provide a disc brake assembly having a secondary or throwaway metal backing plate to which the friction brake lining is molded for assembly with a primary or permanent backing plate without requiring the use of rivets.

It is an extension of the foregoing object to form the secondary backing plate out of thin gage metal to permit high volume, low-cost stamping, in order to justify discarding the secondary backing plate with the worn brake lining.

It is still another object of the invention to provide a single, standard designed, secondary backing plate segment for use with different gage primary backing plate segments.

In accordance with the foregoing objectives, there is provided a disc brake shoe assembly comprising primary and secondary backing plates, the secondary backing plate being of relatively thin gage metal compared to the primary backing plate and having composition brake lining material bonded thereto. The primary and secondary backing plates include interlocking means for joining the respective backing plates together to provide the aforementioned brake shoe assembly.

BRIEF DESCRIPTION OF THE DRAWINGS

These and other objects and advantages of the invention will become apparent from the following more detailed explanation when taken in conjunction with the accompanying drawing in which:

As shown in FIG. 4 of the drawings, a primary, metal backing plate 10, is formed of high strength steel and comprises a plurality of equally-spaced, recessed slots 12 that are formed in an arcuate pattern in face 14 of backing plate 10. These slots 12 are elongated generally in a radial direction, having a depth of preferably 0.1156 in., which is less than the thickness of primary backing plate 10.

Figure 1:
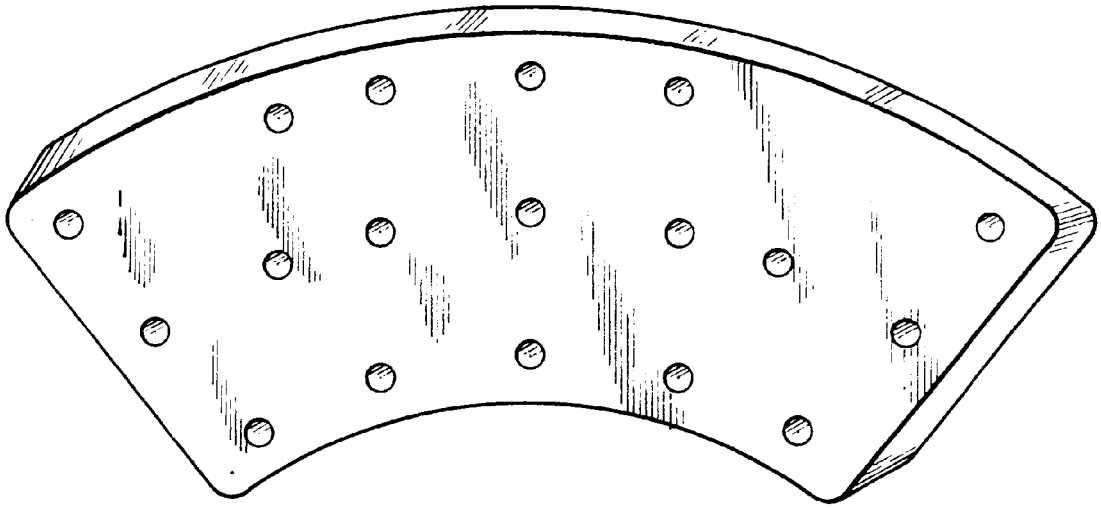
FIG. 1 PRIOR ART
FIGS. 1 and 2 are oblique pictorial views showing a molded composition block of brake shoe lining and a metal backing plate, respectively, to which the brake lining may be affixed by rivets, as known in the prior art.
Figure 2:
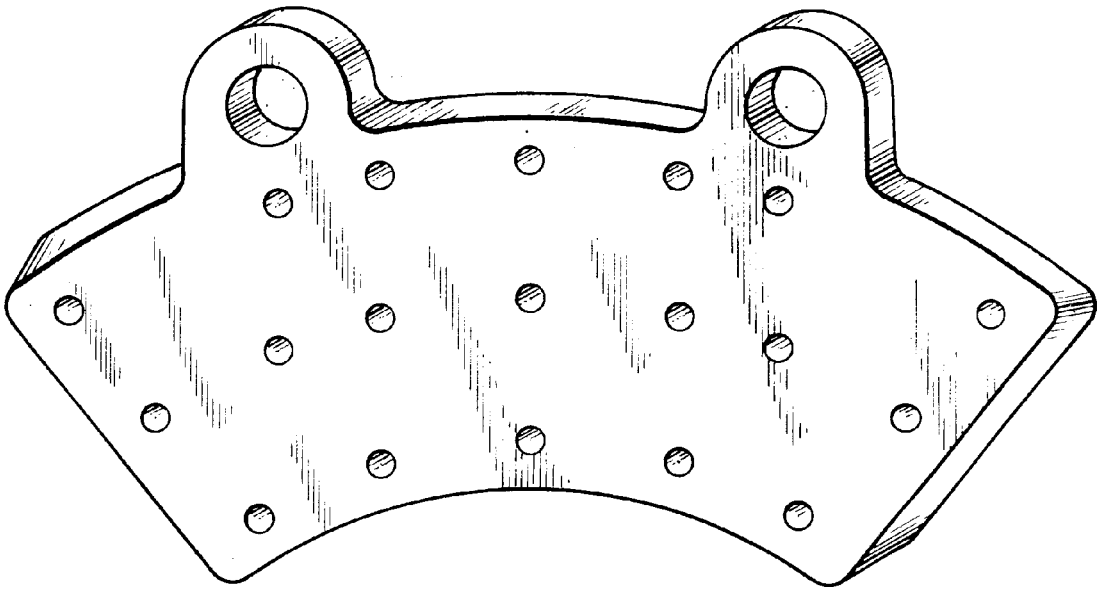
FIG. 2 PRIOR ART
Figure 3:
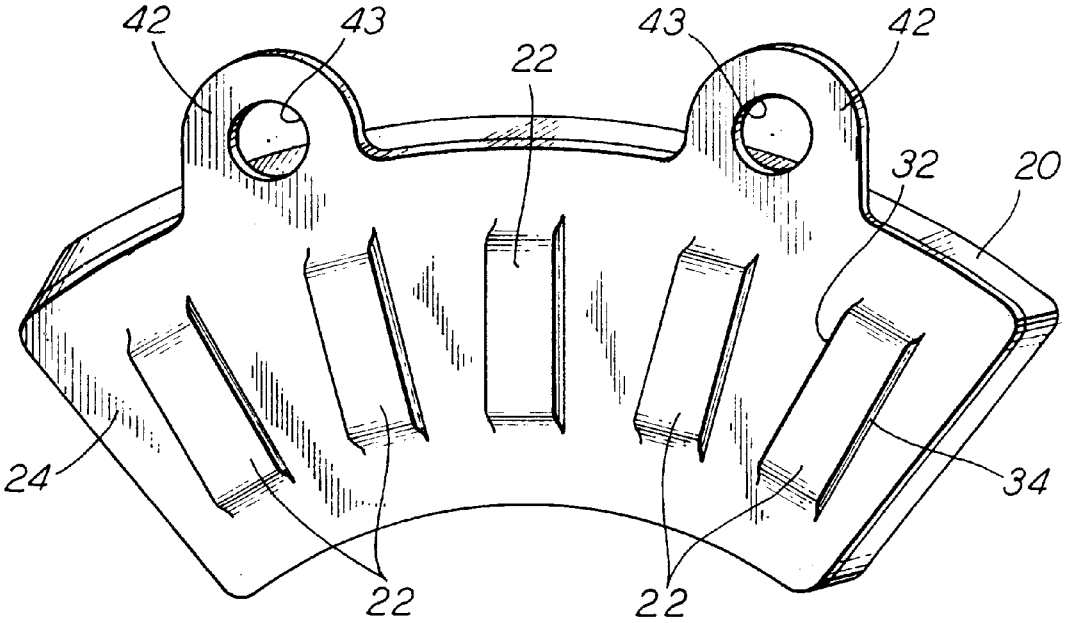
FIG. 3 is an oblique pictorial view showing a new backing plate to which is bonded a composition brake shoe lining.
Figure 4:
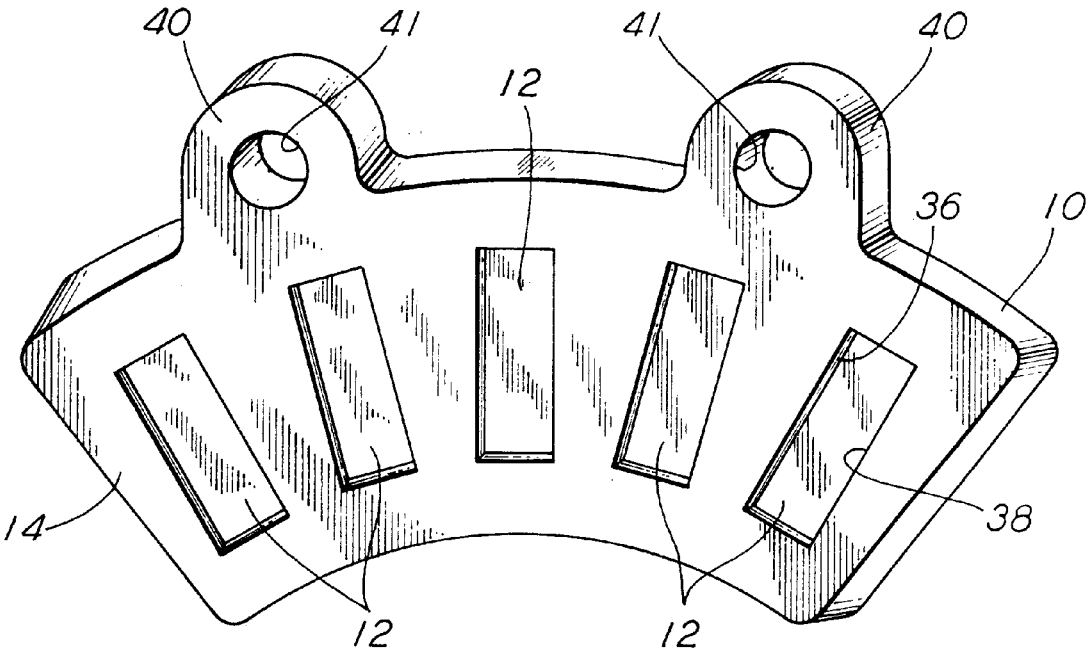
FIG. 4 is an oblique pictorial view showing a complimentary backing plate with which the backing plate of FIG. 3 is adapted to be mated.

A secondary metal backing plate 20, as shown in FIG. 3, comprises a plurality of radial straps 22 that are upraised from a face 24 of backing plate 20 opposite the surface to which a composition brake lining 26 is bonded. Straps 22 may be formed by stamping, for example, so that sections of the backing plate are displaced from face 24 and correspond in number and shape with the plurality of slots 12 in primary backing plate 10. Secondary backing plate 20 is formed from relatively thin gage steel to accommodate the aforementioned stamping operation, the thickness of this secondary backing plate 20 being preferably 0.0897 in. The height of the upraised straps 22 above face 24 is less than the depth of slots 12, preferably 0.1103 in., for a purpose hereinafter explained.

Figure 5:
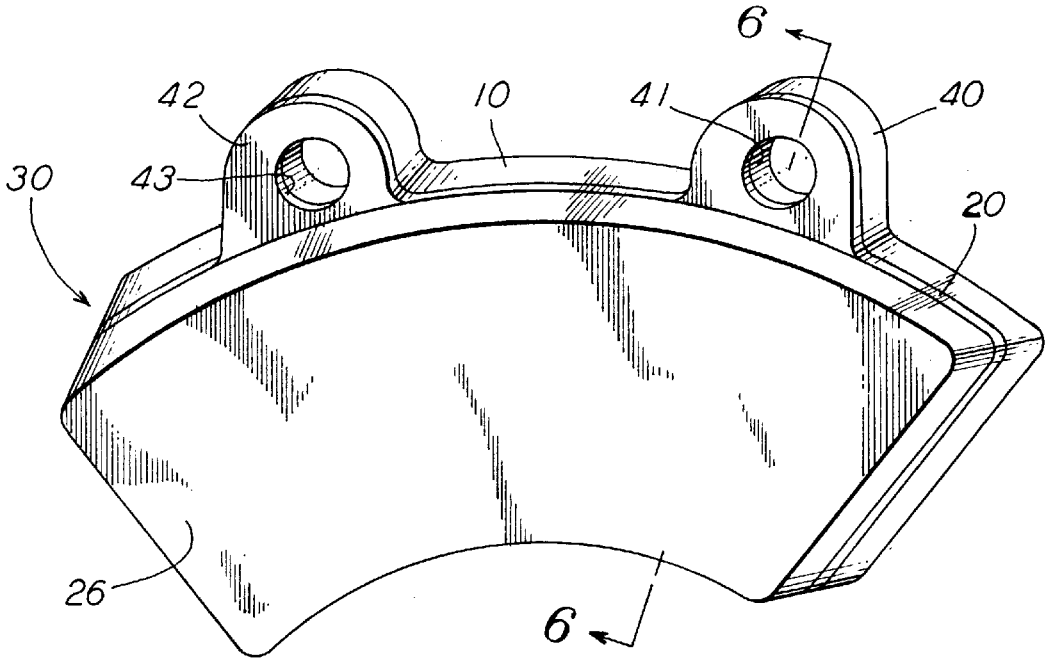
FIG. 5 is an oblique pictorial view showing a novel brake shoe assembly formed by interlocking engagement of the backing plates of FIGS. 3 and 4.

Primary backing plate 10 and secondary backing plate 20 are interconnected via the intermediary of slots 12 and upraised straps 22, the latter being engaged in slots 12 to form an integral disc brake shoe assembly 30, as shown in FIG. 5, by mating the confronting faces 14 and 24 of the respective backing plates 10 and 20. Each upraised strap 22 of backing plate 20 has parallel, longitudinal sides 32, 34 that are contiguous with corresponding sides 36, 38 of the respective slots 12 in backing plate 10, when the backing plates are interconnected. Accordingly, a series of force transmitting surfaces are provided between the plurality of radial straps 22 and slots 12 for supporting bi-directional, tangential, reactive forces of a brake disc (not shown) when a braking force is applied to the disc brake shoe assembly 30, by means of a disc brake unit (not shown) with which the brake shoe assembly is associated.

Backing plate 10 is further provided with a pair of lugs 40 that project beyond the outer radius of the brake disc; and backing plate 20 is provided with a similar pair of projecting lugs 42, these lugs having coaxially aligned holes 41 and 43, respectively, in which bushings (not shown) may be installed by either the manufacturer or customer to receive a pair of mounting pins (not shown) of the disc brake unit on which the disc brake shoe assembly 30 is slidably hung.

Figure 6:
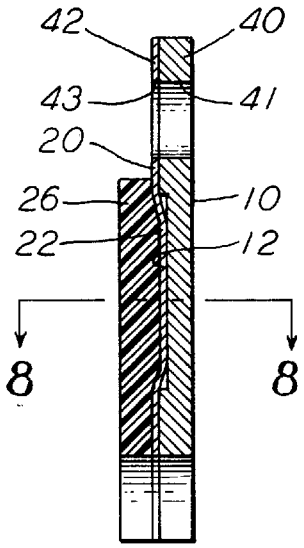
FIG. 6 is a section view taken along the lines 6—6 of FIG. 5 showing the interlocking engagement of the backing plates of FIGS. 3 and 4.
Figure 7:
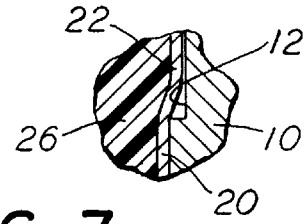
FIG. 7 is a partial, enlarged, section view corresponding to the view of FIG. 6.
Figure 8:
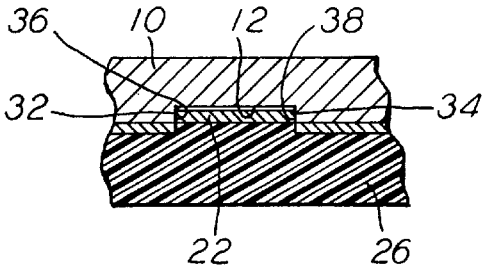
FIG. 8 is a section view taken along the lines 8—8 of FIG. 6 showing the interlocking engagement of the backing plates of FIGS. 3 and 4 looking in a direction perpendicular to the direction shown in FIG. 6.

As shown in FIG. 6, and particularly in the enlarged view of FIG. 7, the depth of slots 12 in backing plate 10 is slightly greater than the height that straps 22 are upraised from face 24, so that during mating of the primary and secondary backing plates, confronting faces 14 and 24 are assured of having full surface contact. Also, straps 22 are upraised sufficiently to provide full side engagement thereof with the contiguous sides of slots 12, as can be seen in the view of FIG. 8.

It will now be appreciated that in changing out worn brake shoe linings, brake shoe assembly 30 of the present invention is removed from the brake unit by removing the brake shoe mounting pins, after which the secondary backing plate having the worn lining is separated from the primary backing plate by disengagement of straps 20 from slots 12. This permits replacement of the worn brake shoe lining by simply replacing the secondary backing plate having the worn lining with another secondary backing plate having new lining. The low cost of the thin, stamped, secondary backing plate 20 makes it economically feasible to scrap the secondary backing plate with worn lining. The replacement secondary backing plate having new shoe lining is interlocked with primary backing plate 10 by placing face 24 of secondary backing plate 20 against face 14 of primary backing plate 10, so that the plurality of upraised straps 22 on secondary backing plate 20 enter the corresponding slots 12 in primary backing plate 10. The resulting brake shoe assembly 30 is then located in the brake unit and secured in place by inserting the brake unit mounting pins through the aligned holes 41, 43 in lugs 40, 42 of the respective backing plates. In this manner, brake shoe assembly 30 is restored to a new brake shoe condition without having to remove any rivets or the like in order to reclaim the primary backing plate 10 from its worn brake shoe lining for subsequent re-use.

Application of the brakes following change-out of the worn brake shoe lining positively interlocks straps 22 with slots 12, as the primary and secondary backing plates are compressed between the vehicle brake disc and brake unit. Depending upon the direction of disc rotation, a tangential reaction force is imparted to the disc lining, so that the longitudinal sides 32 or 34 of straps 22 engage sides 36 or 38 of slots 12. As a result of this engagement, reaction to the retarding force developed at the friction brake lining is transmitted from the secondary backing plate 20 to the primary backing plate 10 via the intermediary of the interlocking straps and slots. In providing a plurality of interlocking straps and slots, it will be appreciated that the tangential reaction force effective at the respective backing plates is divided between a multitude of side surfaces 32, 36 or 34, 38, so that the chance of failure of the interlocking component parts due to high stresses is eliminated. Being supported on mounting pins in the brake unit via holes 41 in lugs 40, the primary backing plate in turn transmits the reaction force to the brake unit body. It will be noted, however, that the reaction force acting on the thin secondary backing plate 20 is not supported by the mounting pins that pass through holes 43 in lugs 42 thereof, due to the reaction force being transmitted via the interlocking straps and slots. This assures that the relatively thin section secondary backing plate does not wear through the support lugs 42 at holes 43 therein. Consequently the integrity of the secondary backing plate support is assured.

In accordance with the foregoing, it will be appreciated that the disc brake shoe assembly 30 takes advantage of the strength of the thick gage, primary backing plate 10, without requiring the disc brake lining to be directly bonded or mechanically affixed thereto. The primary backing plate 10 may therefore be retained as part of the vehicle disc brake unit without becoming involved in the brake shoe relining process, thereby further saving considerable expense in shipping and handling costs.

In accordance with the foregoing, it will be appreciated that the unique brake shoe assembly of the present invention is advantageous from the standpoint that:

1. The design accommodates direct bonding of the friction brake lining material to a metal backing plate without requiring rivets or other means of attachment.

2. The friction lined backing plate may be produced economically by high-volume, low-cost metal stamping.

3. Assembly of the friction lined backing plate with the primary backing plate may be accomplished without special tools.

4. Worn out brake shoes may be economically discarded and the thin metal backing plate used as scrap metal.

5. Thick gage primary backing plates may be retained at customer site to eliminate shipping between customer and re-manufacturer.

6. A single molded product design is suited for application with different thickness primary backing plates, to compensate for disc wear, as required in the absence of automatic slack adjusting type brake units.

I claim:

1. A disc brake shoe assembly comprising:

(a) separate primary and secondary metal backing plates;

(b) a block of brake lining material bonded to one face of said secondary backing plate, said primary backing plate having one face with which the face opposite said one face of said secondary backing plate is engaged in an assembled condition of said primary and secondary backing plates, wherein said secondary backing plate is interposed between said primary backing plate and said block of brake lining material, the thickness of said secondary backing plate being less than the thickness of said primary backing plate;

and (c) interconnecting means for releasably locking said primary and secondary backing plates against relative movement in response to a tangential force acting on one of said backing plates in said assembled condition thereof comprising:

(i) a plurality of elongated radial slots all being formed in said one face of said primary backing plate, each said slot having a planar base recessed from said one face of said primary backing plate and elongated parallel sides perpendicular to said one face of said primary backing plate; and (ii) a plurality of elongated radial straps all projecting from said opposite face of said secondary backing plate, each said strap having a planar head upraised from said opposite face and elongated parallel sides perpendicular to said opposite face, said plurality of straps having a configuration complementary to said plurality of slots and being engageable therewith such that the respective elongated sides therebetween are contiguous in said assembled condition, said primary and secondary backing plates in said assembled condition having free relative movement in a direction parallel to said perpendicular sides of said slots and said recesses in the absence of a tangential force on said primary and secondary backing plates to accommodate disassembly thereof.

2. A disc brake shoe assembly as recited in said claim 1, wherein the minimum depth of said plurality of slots is at least as great as the maximum height said plurality of straps are upraised from said opposite face of said secondary backing plate to assure said face-to-face contact between said one face of said primary backing plate and said opposite face of said secondary backing plate.

3. A disc brake shoe assembly as recited in claim 2, wherein said plurality of straps are formed integral with said secondary backing plate.

4. A disc brake shoe assembly as recited in claim 2, wherein each one of said plurality of straps comprises a displaced section of said secondary backing plate.

5. A disc brake shoe assembly as recited in claim 1, wherein said primary backing plate is an arcuate segment having at least one lug projecting from the outer periphery thereof, said at least one lug lying in the plane of said primary backing plate and having an opening therethrough.

6. A disc brake shoe assembly as recited in claim 5, wherein said at least one lug is the same thickness as said primary backing plate.

7. A disc brake shoe assembly as recited in claim 6, wherein said secondary backing plate is an arcuate segment having at least one lug projecting from an outer periphery thereof, said at least one lug lying in a plane of said secondary backing plate and having an opening therethrough.

8. A disc brake shoe assembly as recited in claim 7, wherein said at least one lug of said secondary backing plate is the same thickness as said secondary backing plate between said one and said opposite faces thereof.

9. A disc brake shoe assembly as recited in claim 8, wherein said opening in said at least one lug of said primary backing plate is coaxial with said opening in said at least one lug of said secondary backing plate.

*10. A disposable secondary backing plate for use in a disc brake shoe assembly having separate primary and secondary backing plates, and having an interconnecting means for releasably locking the primary and secondary backing plates against relative movement in response to a tangential force acting on one of said backing plates in such assembly, said disposable secondary backing plate comprising;*

*(a) a thickness less than the thickness of such primary backing plate,*

*(b) a block of brake lining material bonded to a first face of said secondary backing plate, and*

*(c) a plurality of elongated radial straps projecting from a second face of said secondary backing plate, said elongated radial straps having a configuration adapted to mate with and engage a plurality of complementary radial slots formed in an abutting face of such primary backing plate.*

*11. A disposable secondary backing plate for use in a disc brake shoe assembly having separate primary and secondary backing plates, according to claim 10, in which said plurality of elongated radial straps each have a planar head upraised from said second face of said secondary backing plate.*

*12. A disposable secondary backing plate for use in a disc brake shoe assembly having separate primary and secondary backing plates, according to claim 10, in which said plurality of elongated radial straps each have elongated parallel sides perpendicular to said second face of said secondary backing plate.*

*13. A disposable secondary backing plate for use in a disc brake shoe assembly having separate primary and secondary backing plates, according to claim 10, in which said plurality of elongated straps are formed integral with said secondary backing plate.*

*14. A disposable secondary backing plate for use in a disc brake shoe assembly having separate primary and secondary backing plates, according to claim 10, in which said plurality of elongated straps comprise displaced sections of said secondary backing plate.*

*15. A disposable secondary backing plate for use in a disc brake shoe assembly having separate primary and secondary backing plates, according to claim 10, in which said secondary backing plate is generally an arcuate segment in shape.*

*16. A disposable secondary backing plate for use in a disc brake shoe assembly having separate primary and secondary backing plates, according to claim 15, in which said secondary backing plate has at least one lug projecting from an outer periphery thereof, said at least one lug adapted to mate with a lug on such primary backing plate.*

*17. A disposable secondary backing plate for use in a disc brake shoe assembly having separate primary and secondary backing plates, according to claim 16, in which said at least one lug is provided with an aperture therethrough adapted to coaxially mate with an aperture through such lug on such primary backing plate.*

*18. A disposable secondary backing plate for use in a disc brake shoe assembly having separate primary and secondary backing plates, according to claim 10, in which said secondary backing plate is made of sheet steel having a thickness of about 0.0897 inch.*

*19. A disposable secondary backing plate for use in a disc brake shoe assembly having separate primary and secondary backing plates, according to claim 18, in which said plurality of elongated straps are formed by stamping.*

*20. A disposable secondary backing plate for use in a disc brake shoe assembly having separate primary and secondary backing plates, according to claim 19, in which said plurality of elongated straps each have a planar head upraised from said second face of said secondary backing plate by a distance of approximately 0.1103 inch.*

* * * * *